United States Patent
Hohng et al.

(10) Patent No.: US 9,563,046 B2
(45) Date of Patent: Feb. 7, 2017

(54) CONFOCAL FLUORESCENCE MICROSCOPE

(75) Inventors: Sung-Chul Hohng, Seoul (KR); Jin-Woo Lee, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 329 days.

(21) Appl. No.: 14/342,966

(22) PCT Filed: Sep. 6, 2012

(86) PCT No.: PCT/KR2012/007190
§ 371 (c)(1),
(2), (4) Date: Mar. 5, 2014

(87) PCT Pub. No.: WO2013/036049
PCT Pub. Date: Mar. 14, 2013

(65) Prior Publication Data
US 2014/0218794 A1    Aug. 7, 2014

(30) Foreign Application Priority Data
Sep. 6, 2011 (KR) .................. 10-2011-0090022

(51) Int. Cl.
G02B 21/00 (2006.01)
G02B 21/16 (2006.01)

(52) U.S. Cl.
CPC ......... *G02B 21/0076* (2013.01); *G02B 21/002* (2013.01); *G02B 21/0024* (2013.01); *G02B 21/0048* (2013.01); *G02B 21/16* (2013.01)

(58) Field of Classification Search
CPC ............. G02B 21/0076; G02B 21/002; G02B 21/0048; G02B 21/0024
USPC ........................................................ 359/385
See application file for complete search history.

(56) References Cited

U.S. PATENT DOCUMENTS

| 5,587,832 A * | 12/1996 | Krause ............... G02B 21/004 250/216 |
| 2009/0323058 A1* | 12/2009 | Dyba .................... G01N 21/65 356/301 |

FOREIGN PATENT DOCUMENTS

| JP | 09-304701 A | 11/1997 |
| JP | 2003-029152 A | 1/2003 |
| KR | 10-20080092014 | 9/2008 |

* cited by examiner

*Primary Examiner* — Thomas K Pham
*Assistant Examiner* — Mitchell Oestreich
(74) *Attorney, Agent, or Firm* — Wells St. John P.S.

(57) ABSTRACT

A confocal fluorescence microscope of the present invention consists of: a light source unit broadly comprising one or more short wavelength laser beams; a lens unit which converts parallel light, emitted from a light source, into linear light having an appropriate size; a multi-color mirror which reflects the light source and enables fluorescence to transmit so as to separate the light source and the fluorescence; a scan mirror which radiates the light source over a wide area and scatters the fluorescence over a large-area camera; a microscope unit which radiates the incident light source to a target object, collects the fluorescence emitted from the target, and outputs the collected fluorescence; and a detecting unit which removes the background of the outputted fluorescent signal and observes the outputted fluorescent signal.

15 Claims, 3 Drawing Sheets

CONFOCAL FLUORESCENCE MICROSCOPE

FOREIGN PRIORITY CLAIM

This is a 35 U.S.C. §371 application of, and claims priority to, International Application No. PCT/KR2012/007190, which was filed Sep. 6, 2012, and which claims priority to KR 10-2011-0090022, filed on Sep. 6, 2011, the entirety of all of the applications are incorporated herein by reference.

TECHNICAL FIELD

The present invention relates generally to a confocal fluorescence microscope and, more particularly, to a confocal fluorescence microscope that is capable of observing a single fluorescent molecular signal in real time, and an observation method thereof.

BACKGROUND ART

Confocal fluorescence microscopy is a technology that is capable of obtaining an improved image by removing background signals emitted from parts other than the focal plane of a microscope lens using a pinhole or the like, compared to conventional fluorescence microscopy. For this reason, confocal fluorescence microscopy technology is widely used in biological research.

A common confocal fluorescence microscopy technology requires scanning in two axial directions in order to obtain one image because light is focused in a dot form in order to observe fluorescent light. Accordingly, the common confocal fluorescence microscopy technology is disadvantageous in that it takes an excessively long time to obtain one image and it is difficult to observe the rapid movements of biological molecules and interactions therebetween within a cell.

A method devised to overcome the above disadvantages is line scan confocal microscopy or spinning disk confocal microscopy. In line scan confocal microscopy, light is focused in a line form, rather than in a dot form, using a cylindrical lens. As a result, the time it takes to obtain an image can be significantly reduced because scanning only in a single axial direction is required to obtain an image. In spinning disk confocal microscopy, an image can be rapidly obtained in such a way as to divide light into several parts, form several dot-shaped focuses at the same time, bore a hole through a disk, and rotate the disk. These two methods can obtain images at a speed (of several tens of Hz) close to a real-time speed.

Recently, with the advancement of related technology, the fluorescence microscopy technology has been advanced to the extent that a single fluorescent molecule can be observed. As a single fluorescent molecule can be observed, the various phenomena of life that were difficult to observe have become understood, and thus the fluorescence microscopy technology is being widely used. A single fluorescent molecule can be observed only when background signals are maximally reduced because the single fluorescent molecule has a very weak fluorescent signal. For this purpose, a total internal reflection method is widely used. When total reflection is generated between a slide and a medium, an evanescent wave is generated, which excites a fluorescent light substance. In this case, background signals generated from parts other than a part where total reflection is generated can be reduced because the range of the evanescent wave is very short, that is, about 200 to 300 nm from a surface where total reflection was generated. However, phenomena occurring inside a cell cannot be observed using the total internal reflection method because only fluorescent light in a very short range near a surface of the cell can be observed using the total internal reflection method.

The confocal microscopy method can be used to measure fluorescent light at a deep location inside a cell and the signal of a single fluorescent molecule, unlike the total reflection microscopy method. However, a common confocal microscope may not be used to observe a rapid change within a cell because the time it takes to obtain an image is long, as described above. In particular, because of its low speed, it is difficult to apply the common confocal microscope to recent ultra-high definition imaging technology based on the determination of the location of a single fluorescent molecule. In the case of line scan confocal microscopy and spinning disk confocal microscopy used to overcome measurement speed issues, the degree to which background noise is reduced is lower than when using a dot-shaped confocal method, and a detector used for observation has low performance. Accordingly, a single fluorescent molecular signal cannot be observed using currently commercialized equipment.

As a result, in order to observe a single molecule fluorescent light in a thick object, such as a cell or a tissue, there is a need for 1) an ability to observe fluorescent light at a deep location, 2) a rapid measurement speed of several tens of Hz or higher, and 3) a high signal-to-noise ratio and high-performance detector for observing single molecule fluorescent light.

DISCLOSURE

Technical Problem

As described above, an object of the present invention is to observe a single fluorescent molecular signal in real time (at several tens of or higher or higher) in a cell or a tissue.

Technical Solution

In order to accomplish the above object, the present invention includes a light source unit configured to include one or more short-wavelength lasers, a lens unit configured to convert parallel light of a light source into linear light of an appropriate size, a polychromic mirror configured to separate the light of the light source and fluorescent light by reflecting the light of the light source and transmitting the fluorescent light, a scan mirror configured to radiate the light of the light source onto the wide area of an object and to scatter the fluorescent light over a large-area camera, a microscope unit configured to radiate the light of the light source onto the object, to condense the fluorescent light generated from the object, and to emit the fluorescent light, and a detection unit configured to remove a background from an emitted fluorescent light signal and then observe the fluorescent light signal.

The light source unit may include one or more short-wavelength lasers, and beams of light from the lasers are combined together using dichroic mirrors having corresponding wavelengths.

The lens unit may include three circular lenses and three cylindrical lenses.

The lens unit may be divided into a first lens unit including three cylindrical lenses and one circular lens before the polychromic mirror, and a second lens unit including two circular lenses after the polychromic mirror.

In the first lens unit of the lens unit, the curved surfaces of the two cylindrical lenses are in a horizontal direction and the curved surface of the one cylindrical lens is in a vertical direction, and thus the focus and size of the component of the light of the light source in a horizontal direction and the focus and size of the component of the light of the light source in a vertical direction are separately controlled, thereby converting the light of the light source into linear light when the light of the light source is radiated onto the object.

The two circular lenses of the second lens unit of the lens unit may function to provide the light of the light source to the microscope unit after controlling the size and focus of the light of the light source, and may also function to provide fluorescent light received from a microscope to the polychromic mirror.

The polychromic mirror may reflect the light of the light source, and may transmit the light of other fluorescent light wavelengths.

The scan mirror may scan the light of the light source, thereby allowing the light to be radiated on the wide area of the object, and, simultaneously, may inversely scan fluorescent light emitted from different parts of the object, thereby allowing beams of fluorescent light to pass through the same optical path after the scan mirror.

The first Galvano mirror of the scan mirror and the second Galvano mirror and camera of the detection unit may be synchronized with one another.

The microscope unit may include a mirror configured to function to provide the light of the light source received from the lens unit to the object lens by reflecting the light of the light source, and an object lens configured to directly radiate the light of the light source onto the object and to condense fluorescent light emitted from the object.

The detection unit may include an electron multiplying charge coupled device (EMCCD) camera configured to detect fluorescent light, a second Galvano mirror configured to scan the fluorescent light onto the camera, a slit configured to remove fluorescent light emitted from parts other than a focal plane, and three circular lenses configured to control the focus of the fluorescent light.

The width of the slit of the detection unit may be 1 airy unit (AU) in order to maximally remove a background while minimizing the loss of fluorescent signals.

Advantageous Effects

The present invention configured and operated as described above is advantageous in that a single fluorescent molecular signal can be observed using a confocal microscope method because background signals generated from parts other than an object are removed using a line scan confocal microscope method and the large-area EMCCD camera having better sensitivity than a conventional linear camera is used.

Furthermore, the present invention is advantageous in that observation speed (several tens of Hz) close to real-time speed can be obtained using a method of scanning inversely scanned fluorescent light onto the large-area CCD camera using the second Galvano mirror.

Furthermore, the present invention is advantageous in that a single fluorescent molecular signal can be observed even in a thick object because a confocal microscope method is used.

Furthermore, the present invention is advantageous in that an ultra-high definition image based on the determination of the position of a single fluorescent molecule can be obtained at a deeper location in a cell or a tissue using a confocal microscope method.

DETAILED DESCRIPTION OF THE EMBODIMENTS

Preferred embodiments of a confocal fluorescence microscope for observing a single fluorescent molecule in real time according to the present invention will be described in detail below with reference to the accompanying drawings.

Figure 1:
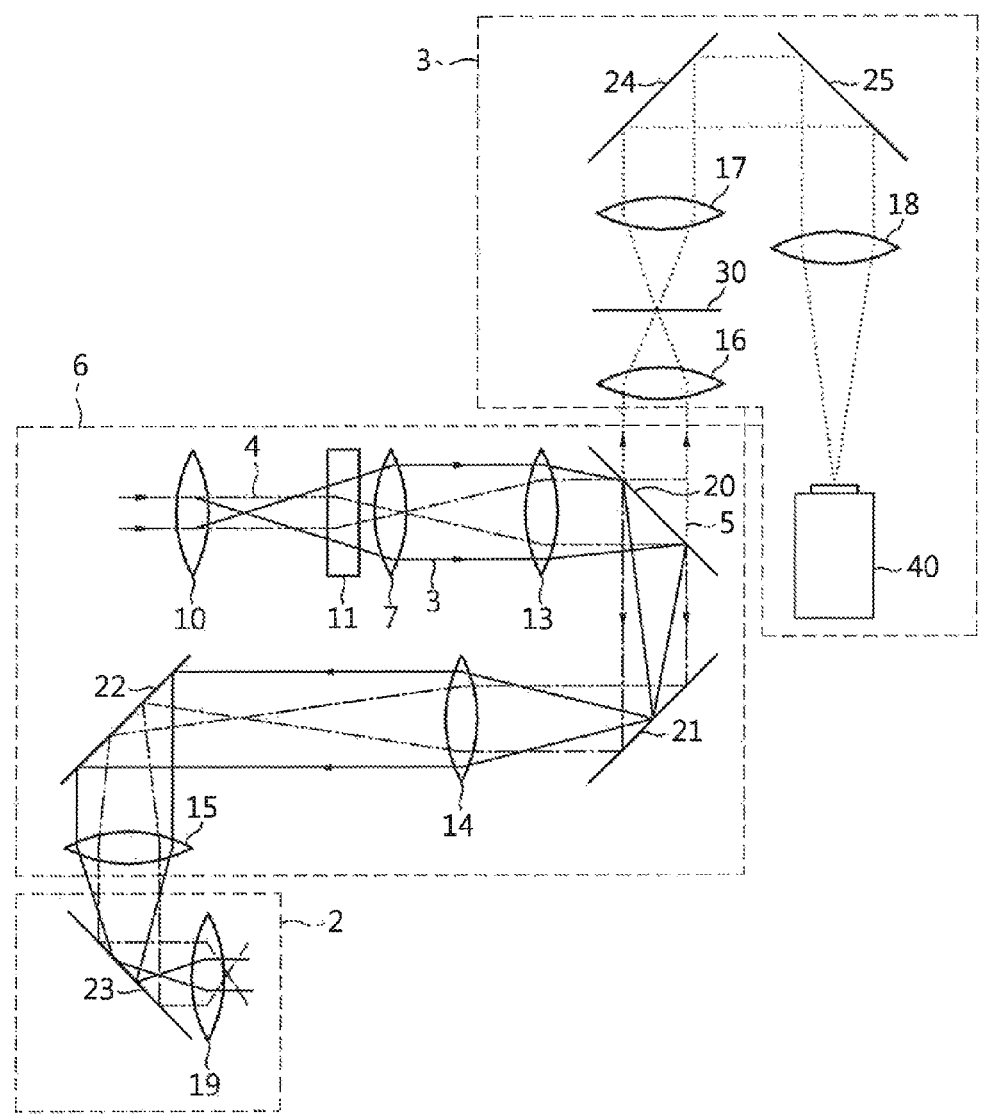
FIG. 1 is an overall schematic top view of a confocal fluorescence microscope according to an embodiment of the present invention.
Figure 2:
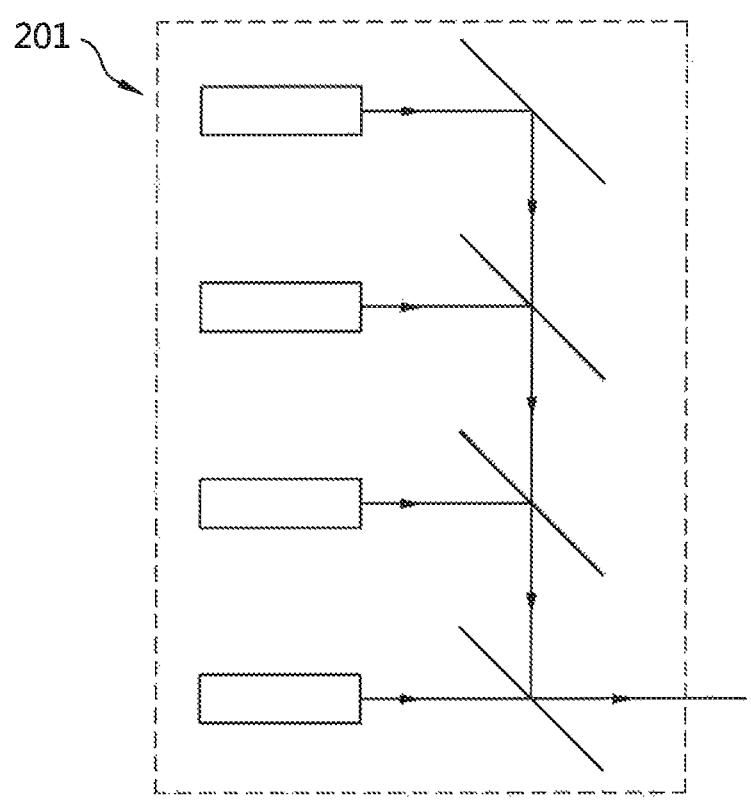
FIG. 2 is a schematic diagram of a light source unit.
Figure 3A:
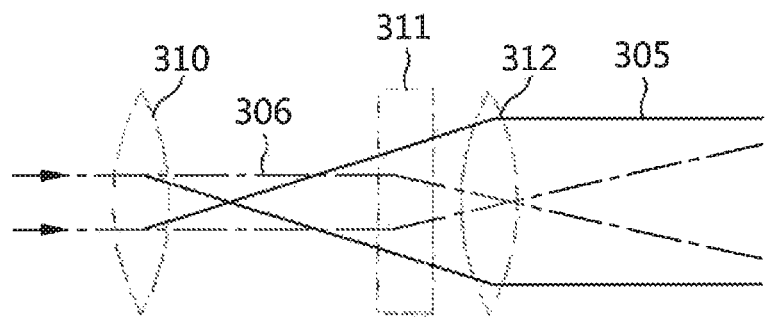
FIGS. 3A and 3B are diagrams illustrating the arrangement of cylindrical lenses based on the curved surfaces thereof.
Figure 3B:
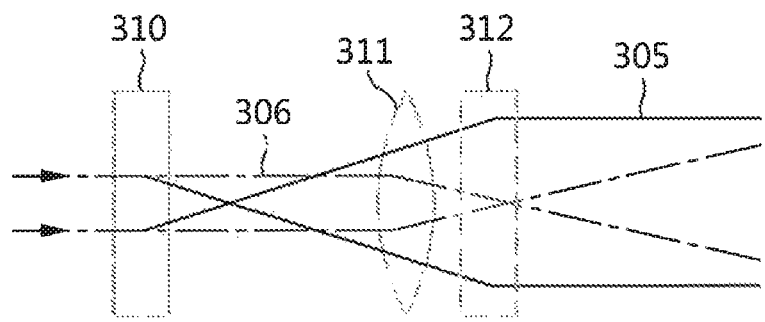

FIG. 1 is an overall schematic diagram of a confocal fluorescence microscope according to an embodiment of the present invention with a light source unit omitted. FIG. 2 is a schematic diagram of a light source unit, and FIGS. 3A and 3B are diagrams illustrating the arrangement of cylindrical lenses based on the curved surfaces thereof. FIG. 3A is a top view when the cross sectionals of the cylindrical lenses are viewed from above, and FIG. 3B is a side view when the cross sections of the cylindrical lenses are viewed from side. In FIGS. 2, 3A and 3B, the components illustrated in FIG. 1 are assigned three-digit reference numerals that each include a first digit corresponding to the number of a corresponding drawing and the remaining two digits corresponding to the corresponding reference numeral of FIG. 1. For convenience of description, the horizontal components 3 and 303 of light are indicated by solid lines, the vertical components 4 and 304 of light are indicated by chain-clashed lines, and a fluorescent signal 5 is indicated by a dotted line.

The real-time linear confocal fluorescence microscope according to the present invention is characterized by including a light source unit 201 configured to include one or more short-wavelength lasers, a lens unit 6 configured to make light from the light source unit 201 linear, a first Galvano mirror 21 configured to provide light to different parts of an object, a microscope unit 2 configured to radiate received light onto an object and condense fluorescent light generated by the object, and a detection unit 3 configured to observe the fluorescent light. In particular, the technical gist of the present invention is that a large-area CCD camera 40 is used using a method in which a fluorescent signal inversely scanned by the first Galvano mirror 21 is scanned onto a large-area CCD camera using the second Galvano mirror 25 of the detection unit.

The light source unit 201 includes one or more short-wavelength lasers, and light emitted from the lasers is collimated into a single beam of light using dichromatic mirrors suitable for respective laser wavelengths.

The collimated light passes through a first cylindrical lens 10. In this case, since the first cylindrical lens 10 has a curved surface in a horizontal direction, the horizontal component 3 of the collimated light is changed from parallel light to light that is focused, and the vertical component 4 thereof maintains parallel light.

The light that has passed through the first cylindrical lens 10 passes through a second cylindrical lens 11. In this case, a curved surface of the second cylindrical lens 11 is vertical to the first cylindrical lens 10. That is, since the curved surface of the second cylindrical lens 11 is in a vertical direction, the horizontal component 3 of the light is not influenced, and the vertical component 4 thereof is changed from the parallel light to light that is focused.

The light that has passed through the second cylindrical lens 11 passes through a third cylindrical lens 12. The third cylindrical lens 12 is spaced apart from the first cylindrical lens 10 by the focal distance of the first cylindrical lens 10 plus the focal distance of the third cylindrical lens 12. In this case, the direction of the curved surface of the third cylindrical lens 12 is the same as that of the first cylindrical lens 10, and is vertical to that of the second cylindrical lens 11. That is, since the curved surface of the third cylindrical lens 12 is in a horizontal direction, the vertical component 4 of the light is not influenced. The horizontal component 3 of the light becomes parallel light after passing through the third cylindrical lens 12 because the third cylindrical lens 12 is placed at a position that is spaced apart by the sum of the focal distances of the first cylindrical lens 10 and the third cylindrical lens 12.

The focal distance of the third cylindrical lens 12 and the focal distance of the first cylindrical lens 10 are determined such that the focal distance of the third cylindrical lens 12 is 10 times the focal distance of the first cylindrical lens 10. Preferably, the focal distance of the first cylindrical lens 10 and the focal distance of the third cylindrical lens 12 may be 25 mm and 250 mm, respectively. The size of the horizontal component 3 of the light is increased 10 times after the light has passed through the first cylindrical lens 10 and the third cylindrical lens 12. The size of the increased horizontal component functions to increase the length of a line in linear focus which is generated when the increased horizontal component is subsequently radiated onto an object.

The light that has passed through the three cylindrical lenses passes through the first circular lens 13. The first circular lens 13 is spaced apart from the second cylindrical lens 11 by the focal distance of the second cylindrical lens 11 plus the focal distance of the first circular lens 13. Accordingly, the vertical component 4 of the light becomes parallel light after passing through the first circular lens 13. Furthermore, the horizontal component 3 of the light is changed from parallel light to light that is focused.

Thereafter, the light is reflected from a polychromic mirror 20 and then reflected from the first Galvano mirror 21 again. The polychromic mirror 20 reflects the light of the light source, and transmits fluorescent light having other wavelengths.

The first Galvano mirror 21 is spaced apart from the first circular lens 13 by the focal distance of the first circular lens 13. Accordingly, the horizontal component 3 of the light is focused on the first Galvano mirror 21.

The light reflected from the first Galvano mirror 21 passes through a second circular lens 14. The second circular lens 14 is spaced apart from the first Galvano mirror 21 by the focal distance of the second circular lens 14. Accordingly, the horizontal component 3 of the light becomes parallel light after passing through the second circular lens 14. The vertical component 4 of the light is changed from the parallel light into light that is focused.

The first circular lens 13 and the second circular lens 14 have the same focal distance as the third cylindrical lens 12, that is, 250 mm, and thus the size of the light is not changed.

Thereafter, the light is reflected from a first plane mirror 22. The first plane mirror 22 has a diameter of 2 inches, and has been devised to fully reflect the component 3 of the light in a horizontal direction that has been increased 10 times.

The light reflected from the first plane mirror 22 is incident on the inside of the microscope through the back of the microscope after passing through a third circular lens 15. The third circular lens 15 is spaced apart from the second circular lens 14 by the focal distance of the second circular lens 14 plus the focal distance of the third circular lens 15, and is also spaced apart from the object lens 19 of the microscope unit 2 by the focal distance of the object lens 19 plus the focal distance of the third circular lens 15. The light that has passed through the third circular lens 15 is changed into light that is focused in a horizontal direction and into parallel light in a vertical direction.

The focal distance of the third circular lens 15 is 1.2 times the focal distance of the first circular lens 13, for example, 300 mm. A long focal distance is used to correspond to the distance to the object lens 19.

The light incident on the inside of the microscope passes through the object lens 19 after being reflected from a silver-plated mirror 23 within the microscope.

The silver-plated mirror 23 has been subjected to special coating processing in order to minimize the loss of light and fluorescent light.

The light that has passed through the object lens 19 becomes parallel light in a horizontal direction, and becomes light that is focused in a vertical direction. In this case, the focus in the vertical direction is the same as the focus of the object lens 19. Accordingly, the light incident on an object has a linear shape. (the focus in the vertical direction and the parallel light in the horizontal direction)

The light that has passed through the object lens 19 is incident on an object so that the object generates fluorescent light. In this case, the fluorescent light emitted from the object is condensed by the object lens 19, and the condensed light returns along the path through which the light was incident.

Only the 1-dimensional fluorescent light information of the object may be obtained based on the linear light radiated onto the object. In order to obtain a 2-dimensional fluorescent image, the 2-dimensional fluorescent light information of the object is obtained by moving the light in a direction vertical to the linear light by changing the angle of the first Galvano mirror 21.

The fluorescent light transferred externally through the silver-plated mirror 23 reaches the first Galvano mirror 21 through the third circular lens 15 and the second circular lens 14. Reams of fluorescent light emitted from different positions of the object pass through different optical paths up to the first Galvano mirror 21 depending on an angle of the first Galvano mirror 21, but pass through the same optical paths after the first Galvano mirror 21 because they are inversely scanned by the first Galvano mirror 21.

The inversely scanned fluorescent light passes through the polychromic mirror 20 and is then changed into light that is focused via the fourth circular lens 16 of the detection unit 3. That is, a focus in this case and a focus at which an object is observed in the object lens 19 have a confocal characteristic.

A slit 30 placed at the focus of the fluorescent light functions to remove all background signals emitted from parts other than a focal plane. In this case, if the size of the slit 30 is excessively large, the ability to remove background signals is low. In contrast, if the size of the slit 30 is excessively small, it is difficult to observe a single fluorescent molecule because even a fluorescent signal to be observed is removed. For this reason, the width of the slit 30 is determined to be 1 AU corresponding to one unit of the diffraction limit of the light that is radiated onto an object.

The fluorescent light from which background signals have been removed by the slit 30 is changed into parallel light via a fifth circular lens 17 and then reflected from the second Galvano mirror 25. The second Galvano mirror 25 changes its angle in synchronization with the first Galvano mirror 21. That is, light is radiated onto different parts of an object through the first Galvano mirror 21, and beams of fluorescent light emitted from the different parts of the object move along the same optical path, are scanned by the second Galvano mirror 25 and form fluorescent light at different parts of a large-area camera.

The light reflected from the second Galvano mirror 25 is focused on the large-area CCD camera 40 via a sixth circular lens 18.

The focal distances of the circular lenses and cylindrical lenses of the lens unit 6 and the detection unit 3 may be changed by a user.

The CCD camera 40 is a back-illuminated electron multiplying charge coupled device (EMCCD) camera, and generates a 2-dimensiaonl fluorescent image of 512×512 pixels in each exposure time by being exposed during a designated exposure time. In this case, the consumption of fluorescent signals and the inconsistency between the fluorescent signals of images are minimized because the exposure time of the large-area CCD camera 40 is synchronized with the scan time of the first Galvano mirror 21 and the second Galvano mirror 25.

Although the EMCCD camera has sensitivity to the extent that a single fluorescent molecule can be observed, the EMCCD camera can observe a large area at the same time but has slower observation speed than a conventional linear CCD camera. However, the conventional linear CCD camera is not sensitive enough to observe a single fluorescent molecule. In the present invention, fluorescent light is scanned again by the second Galvano mirror 25, and the scan time of the second Galvano mirror 25 is synchronized with the exposure time of the large-area CCD camera 40. Accordingly, even when a line scan confocal microscope is used, a large-area fluorescent image can be obtained at one time, with the result that slow observation speed can be overcome and an observation speed of 301-Iz or higher can be guaranteed.

Although the principle and operating method of the present invention have been described and illustrated, the present invention is not limited thereto.

In particular, observing a single fluorescent molecular signal in real time using a confocal microscope method is beyond significance in terms of observation, and provides technology essential to super-resolution imaging and systems biology that have recently attracted attention. Accordingly, the appropriate modifications and equivalents of the present invention should be considered to pertain to the scope of the present invention without departing from the spirit and scope of the present invention.

What is claimed is:

1. A confocal fluorescence microscope for observing a single fluorescent molecule, comprising:
    a light source unit configured to comprise one or more short-wavelength lasers and one or more diachronic mirrors and to collimate light;
    a lens unit configured to comprise one or more cylindrical lens and one or more circular lens and to convert the light of the light source unit into linear light;
    a first Galvano mirror configured such that an angle thereof is changeable to obtain 2-dimensional fluorescent light information of an object by moving the light in a direction vertical to the linear light;
    a polychromic mirror placed between the light source unit and the first Galvano mirror;
    a microscope unit configured to radiate the light onto an object and to condense fluorescent light generated by the object;
    a detection unit configured to comprise a large-area camera and a slit for observing the fluorescent light;
    wherein the detection unit further comprises a second Galvano mirror configured to scan the inversely scanned fluorescent light onto the large-area camera; and
    wherein the detection unit comprises three or more lenses, the slit is placed between a fourth circular lens and a fifth circular lens, and a sixth circular lens is placed next to the second Galvano mirror.

2. The confocal fluorescence microscope of claim 1, wherein the second Galvano mirror of the detection unit changes its angle in synchronization with the first Galvano mirror.

3. The confocal fluorescence microscope of claim 1, wherein the large-area camera of the detection unit is a large-area CCD camera.

4. The confocal fluorescence microscope of claim 1, wherein the lens unit comprises three or more cylindrical lenses and three or more circular lenses, a direction of a curved surface of a second cylindrical lens is vertical to a direction of a curved surface of a first cylindrical lens, a third cylindrical lens is spaced apart from the first cylindrical lens by a sum of focal distances of the first cylindrical lens and the third cylindrical lens, and a direction of a curved surface of the third cylindrical lens is identical with the direction of the curved surface of the first cylindrical lens.

5. The confocal fluorescence microscope of claim 4, wherein the focal distance of the first cylindrical lens is 10 times the focal distance of the third cylindrical lens.

6. The confocal fluorescence microscope of claim 5, wherein a focal distance of the second cylindrical lens is twice the focal distance of the first cylindrical lens.

7. The confocal fluorescence microscope of claim 6, wherein the focal distance of the first cylindrical lens is 25 mm, the focal distance of the second cylindrical lens is 50 mm, and the focal distance of the third cylindrical lens is 250 mm.

8. The confocal fluorescence microscope of claim 6, wherein a first circular lens is spaced apart from the second cylindrical lens by a sum of the focal distance of the second cylindrical lens and a focal distance of the first circular lens, the first Galvano mirror is spaced apart from the first circular lens by the focal distance of the first circular lens, a second circular lens is spaced apart from the first Galvano mirror by a focal distance of the second circular lens, and a third circular lens is spaced apart from the second circular lens by a sum of the focal distance of the second circular lens and a focal distance of the third circular lens.

9. The confocal fluorescence microscope of claim 8, wherein each of the focal distance of the first circular lens and the focal distance of the second circular lens is identical with the focal distance of the third cylindrical lens, and the focal distance of the third circular lens is 1.2 times the focal distance of the first circular lens.

10. The confocal fluorescence microscope of claim 9, wherein the focal distance of the third circular lens is 300 mm.

11. The confocal fluorescence microscope of claim 1, wherein each of a focal distance of the fourth circular lens and a focal distance of the fifth circular lens is 4 times a focal distance of a first cylindrical lens, and a focal distance of the sixth circular lens is 10 times the focal distance of the first cylindrical lens.

12. The confocal fluorescence microscope of claim 11, wherein:
   each of the focal distance of the fourth circular lens and the focal distance of the fifth circular lens is 100 mm, and the focal distance of the sixth circular lens is 250 mm.

13. The confocal fluorescence microscope of claim 1, wherein an exposure time of the large-area camera of the detection unit is synchronized with a scan time of the first Galvano mirror and the second Galvano mirror.

14. The confocal fluorescence microscope of claim 1, wherein one or more plane mirrors are provided between the lens unit and the microscope unit.

15. The confocal fluorescence microscope of claim 1, wherein the detection unit comprises one or more plane mirrors.

* * * * *